United States Patent
Yamada et al.

(10) Patent No.: US 8,841,381 B2
(45) Date of Patent: Sep. 23, 2014

(54) AQUEOUS POLYURETHANE RESIN DISPERSION AND PROCESS FOR PREPARING THE SAME

(75) Inventors: Takeshi Yamada, Ube (JP); Masahiro Naiki, Ube (JP)

(73) Assignee: Ube Industries Ltd., Ube-Shi (JP)

( * ) Notice: Subject to any disclaimer, the term of this patent is extended or adjusted under 35 U.S.C. 154(b) by 285 days.

(21) Appl. No.: 13/391,188

(22) PCT Filed: Aug. 3, 2010

(86) PCT No.: PCT/JP2010/063087
§ 371 (c)(1),
(2), (4) Date: Feb. 17, 2012

(87) PCT Pub. No.: WO2011/021500
PCT Pub. Date: Feb. 24, 2011

(65) Prior Publication Data
US 2012/0149841 A1  Jun. 14, 2012

(30) Foreign Application Priority Data

Aug. 20, 2009 (JP) ................................. 2009-190743
Jul. 13, 2010 (JP) ................................. 2010-158493

(51) Int. Cl.
*C09D 175/04* (2006.01)
*C09D 175/08* (2006.01)

(52) U.S. Cl.
CPC ............ *C09D 175/04* (2013.01); *C09D 175/08* (2013.01)
USPC ......................................... 524/839; 524/591

(58) Field of Classification Search
CPC ........................... C09D 175/04; C09D 175/08
USPC .................................. 524/839, 591
See application file for complete search history.

(56) References Cited

U.S. PATENT DOCUMENTS

| | | |
|---|---|---|
| 4,024,113 A | 5/1977 | Ammons |
| 4,103,070 A | 7/1978 | Ammons |
| 4,895,894 A | 1/1990 | Ruetman et al. |
| 4,956,438 A | 9/1990 | Ruetman et al. |
| 5,043,381 A | 8/1991 | Coogan et al. |
| 5,124,424 A | 6/1992 | Endo et al. |
| 5,141,987 A | 8/1992 | Nachtkamp et al. |
| 5,143,997 A | 9/1992 | Endo et al. |
| 5,169,895 A | 12/1992 | Coogan et al. |
| 5,693,703 A | 12/1997 | Hart |
| 5,738,912 A | 4/1998 | Konig et al. |
| 5,859,122 A | 1/1999 | Umeya |
| 6,096,805 A | 8/2000 | Lange et al. |
| 6,433,072 B1 | 8/2002 | Gobel et al. |
| 7,511,082 B2 | 3/2009 | Nakamura et al. |
| 7,538,154 B2 * | 5/2009 | Pohl et al. ..................... 524/591 |
| 7,728,076 B2 | 6/2010 | Wamprecht et al. |
| 2002/0156145 A1 | 10/2002 | Van Den Berg et al. |
| 2004/0077779 A1 | 4/2004 | Schafheutle et al. |
| 2004/0259970 A1 | 12/2004 | Lockhart et al. |
| 2005/0003102 A1 | 1/2005 | Lockhart et al. |
| 2006/0240264 A1 | 10/2006 | Gertzmann et al. |
| 2007/0083002 A1 | 4/2007 | Schafheutle et al. |
| 2007/0155933 A1 | 7/2007 | Watanabe et al. |
| 2008/0004395 A1 * | 1/2008 | Covelli et al. ................. 524/591 |
| 2008/0103282 A1 | 5/2008 | Nagamatsu et al. |
| 2008/0146767 A1 | 6/2008 | Wamprecht et al. |
| 2008/0188625 A1 | 8/2008 | Uchida et al. |
| 2008/0194775 A1 | 8/2008 | Blum et al. |
| 2009/0012201 A1 | 1/2009 | Kim et al. |
| 2009/0118422 A1 | 5/2009 | Uchida et al. |
| 2010/0222448 A1 | 9/2010 | Ziegler et al. |
| 2011/0077352 A1 | 3/2011 | Nakamura et al. |
| 2011/0112245 A1 | 5/2011 | Nakamura et al. |
| 2011/0168603 A1 | 7/2011 | Pettersson |
| 2011/0313101 A1 | 12/2011 | Morikami et al. |

FOREIGN PATENT DOCUMENTS

| | | |
|---|---|---|
| EP | 0 616 007 A1 | 9/1994 |
| EP | 0 665 563 A1 | 8/1995 |
| EP | 2 281 848 A1 | 2/2011 |
| GB | 2 425 771 A | 11/2006 |
| JP | 52-132096 A | 11/1977 |
| JP | 1-104612 A | 4/1989 |
| JP | 2-289616 A | 11/1990 |
| JP | 2-306427 A | 12/1990 |
| JP | 3-128912 A | 5/1991 |
| JP | 3-140318 A | 6/1991 |

(Continued)

OTHER PUBLICATIONS

Matsunaga, "Latest Polyurethane Material and Applied Technique—Road to Polyurethane Production", The Comprehensive Materials and Technology for a Novel Polyurethane Production, CMC Publishing Co., Ltd., Chapter 2, pp. 43, Sep. 30, 2005.
Odian, "Principles of Polymerization", John Wiley & Sons, Inc., Third Edition, 7 pages, 1991.

*Primary Examiner* — Kelechi Egwim

(74) *Attorney, Agent, or Firm* — Birch, Stewart, Kolasch & Birch, LLP

(57) ABSTRACT

An object of this invention is to obtain an aqueous polyurethane resin dispersion having excellent drying property, which can provide a coating film having high hardness. The aqueous polyurethane resin dispersion comprises a polyurethane resin obtained by reacting (a) a polyol compound, (b) a polyisocyanate compound, (c) an acidic group-containing polyol compound and (d) a chain-elongating agent, which is being dispersed in an aqueous medium, wherein the above-mentioned (a) polyol compound contains at least (a1) a polycarbonate polyol having an alicyclic structure at the main chain and (a2) a polymer polyol having a number average molecular weight of 500 to 5000 and having no alicyclic structure.

9 Claims, No Drawings

(56) References Cited

FOREIGN PATENT DOCUMENTS

| | | |
|---|---|---|
| JP | 3-174429 A | 7/1991 |
| JP | 3-220233 A | 9/1991 |
| JP | 4-41517 A | 2/1992 |
| JP | 4-503226 A | 6/1992 |
| JP | 5-9434 A | 1/1993 |
| JP | 5-39340 A | 2/1993 |
| JP | 6-200149 A | 7/1994 |
| JP | 6-248046 A | 9/1994 |
| JP | 7-41539 A | 2/1995 |
| JP | 8-193181 A | 7/1996 |
| JP | 10-72520 A | 3/1998 |
| JP | 10-120757 A | 5/1998 |
| JP | 10-130354 A | 5/1998 |
| JP | 10-273514 A | 10/1998 |
| JP | 11-152321 A | 6/1999 |
| JP | 2000-212240 A | 8/2000 |
| JP | 2001-334615 A | 12/2001 |
| JP | 2002-128851 A | 5/2002 |
| JP | 2002-179787 A | 6/2002 |
| JP | 2002-179758 A | 8/2002 |
| JP | 2003-342335 A | 12/2003 |
| JP | 2005-8888 A | 1/2005 |
| JP | 2005-80643 A | 3/2005 |
| JP | 2005-113318 A | 4/2005 |
| JP | 2005-220255 A | 8/2005 |
| JP | 2005-232447 A | 9/2005 |
| JP | 2005-281544 A | 10/2005 |
| JP | 2006-206774 A | 8/2006 |
| JP | 2006-307215 A | 11/2006 |
| JP | 2006-335951 A | 12/2006 |
| JP | 2007-39673 A | 2/2007 |
| JP | 2007-119749 A | 5/2007 |
| JP | 2007-245369 A | 9/2007 |
| JP | 2008-37987 A | 2/2008 |
| JP | 2008-56760 A | 3/2008 |
| JP | 2008-150590 A | 7/2008 |
| JP | 2008-534710 A | 8/2008 |
| JP | 2008-248014 A | 10/2008 |
| JP | 2008-303284 A | 12/2008 |
| JP | 2008-303285 A | 12/2008 |
| JP | 2009-523188 A | 6/2009 |
| JP | 2010-215885 A | 9/2010 |
| JP | 2010-222554 A | 10/2010 |
| WO | WO 2006/093355 A1 | 9/2006 |
| WO | WO 2006/101433 A1 | 9/2006 |
| WO | WO 2007/005808 A2 | 1/2007 |
| WO | WO 2008/078754 A1 | 7/2008 |
| WO | WO 2009/145242 A1 | 12/2009 |
| WO | WO 2010/004951 A1 | 1/2010 |
| WO | WO 2010/098316 A1 | 9/2010 |

\* cited by examiner

US 8,841,381 B2

AQUEOUS POLYURETHANE RESIN DISPERSION AND PROCESS FOR PREPARING THE SAME

TECHNICAL FIELD

The present invention relates to an aqueous polyurethane resin dispersion, more specifically to an aqueous polyurethane resin dispersion which provides a hard coating film.

BACKGROUND ART

An aqueous polyurethane resin dispersion has been widely utilized as a starting material for a paint or a coating agent, for example, a starting material of a paint or a coating agent for coating an outside and inside of an aircraft, automobile, etc., an external wall surface and a floor material of a house, and the like. The above-mentioned coating films not only play beauty of appearances, but also take a role of protecting the substrate materials, so that hardness, strength and durability are required. For this purpose, an aqueous polyurethane resin dispersion which provides a harder coating film has been strongly desired.

In order to satisfy the above-mentioned properties, aqueous polyurethane resin dispersions using various kinds of polyols have been developed. A polyol is a useful compound as a starting material for preparing a polyurethane resin by the reaction with an isocyanate compound. For example, as a polymer polyol, a polyester polyol, polyether polyol, polycarbonate polyol, etc., have been used for the preparation of an aqueous polyurethane resin dispersion. Among the above-mentioned polymer polyols, the polycarbonate polyol has characteristics that it provides tough coating film as compared with those of the polyester polyol and polyether polyol. Of these, it has been known that the aqueous polyurethane resin dispersion prepared by using a polycarbonate diol having an alicyclic structure provides a coating film excellent in weather resistance and resistance to moist heat (see Patent Literature 1).

Also, it has been known that an aqueous polyurethane resin providing a coating film having high moisture permeability by providing a polyether group at the side chain using a specific polyol (see Patent Literatures 2 and 3).

However, the aqueous polyurethane resin dispersion using a polycarbonate polyol having an alicyclic structure is inferior in drying property, so that there is a problem that hardness is insufficient depending on the drying conditions. Also, there are problems that if the drying time is made long, the whole coating step takes longer times, and that if the drying temperature is made high, the substrate is affected by the temperature in some cases, etc.

Also, there are problems that in the aqueous polyurethane resin having a polyether group at the side chain has high moisture absorption and inferior in water resistance, high hygroscopicity, and inferior in water resistance.
[Patent Literature 1] JP H06-248046A
[Patent Literature 2] JP 2006-335951A
[Patent Literature 3] JP H01-104612A

DISCLOSURE OF THE INVENTION

Problems to be Solved by the Invention

An object of the present invention is to provide an aqueous polyurethane resin dispersion excellent in drying property, and provides a coating film having high hardness.

Means to Solve the Problems

The present inventors have intensively studied to solve the above-mentioned problems, and as a result, they have found that an aqueous polyurethane resin dispersion excellent in drying property and providing a harder coating film can be obtained by using a polycarbonate polyol having an alicyclic structure and a polymer polyol having a specific molecular weight and having no alicyclic structure as polyols in combination, rather than using a polycarbonate polyol having an alicyclic structure alone, whereby the present invention has accomplished.

That is, the present invention has the following constitution.

(1) An aqueous polyurethane resin dispersion which comprises a polyurethane resin obtained by reacting (a) a polyol compound, (b) a polyisocyanate compound, (c) an acidic group-containing polyol compound, and (d) a chain-elongating agent, being dispersed in an aqueous medium, wherein the above-mentioned (a) polyol compound contains at least (a1) a polycarbonate polyol having an alicyclic structure at the main chain and (a2) a polymer polyol having number average molecular weight of 500 to 5000 and having no alicyclic structure.

(2) The aqueous polyurethane resin dispersion described in the above-mentioned (1), wherein a number average molecular weight of (a1) the polycarbonate polyol having an alicyclic structure at the main chain is smaller than a number average molecular weight of (a2) the polymer polyol having no alicyclic structure.

(3) The aqueous polyurethane resin dispersion described in the above-mentioned (1) or (2), wherein (a2) the polymer polyol having number average molecular weight of 500 to 5000 and having no alicyclic structure is a polyether polyol.

(4) The aqueous polyurethane resin dispersion described in the above-mentioned any one of (1) to (3), wherein a weight ratio (a1/a2) of (a1) the polycarbonate polyol having an alicyclic structure at the main chain and (a2) the polymer polyol having a number average molecular weight of 500 to 5000 and having no alicyclic structure in (a) the polyol compound is 99/1 to 25/75.

(5) The aqueous polyurethane resin dispersion described in the above-mentioned any one of (1) to (4), wherein a ratio of an alicyclic structure of (a1) the polycarbonate polyol having an alicyclic structure at the main chain is 10 to 65% by weight.

(6) The aqueous polyurethane resin dispersion described in the above-mentioned any one of (1) to (5), wherein (a) the polyol compound further contains (a3) a low-molecular weight polyol having a molecular weight of less than 500.

(7) A paint composition containing the aqueous polyurethane resin dispersion described in any one of the above-mentioned (1) to (6).

(8) A coating agent composition containing the aqueous polyurethane resin dispersion described in any one of the above-mentioned (1) to (6).

(9) A preparation method of the aqueous polyurethane resin dispersion described in any one of the above-mentioned (1) to (6), which comprises Step ($\alpha$) of obtaining a prepolymer by reacting (a) a polyol compound containing (a1) a polycarbonate polyol having an alicyclic structure at the main chain and (a2) a polymer polyol having number average molecular weight of 500 to 5000 and having no alicyclic structure, (b) a polyisocyanate compound and (c) an acidic group-containing polyol, Step ($\beta$) of neutralizing the acidic group in the above-mentioned prepolymer, Step (γ) of dispersing the neutralized prepolymer in an aqueous medium, and Step (δ) of reacting the prepolymer dispersed in the aqueous medium and (d) a chain-elongating agent.

Effects of the Invention

The aqueous polyurethane resin dispersion of the present invention is excellent in drying property, and can provide a coating film which is excellent in hardness and durability, particularly excellent in hardness.

BEST MODE TO CARRY OUT THE INVENTION (a1) Polycarbonate Polyol Having Alicyclic Structure at the Main Chain A number average molecular weight of (a1) the polycarbonate polyol having an alicyclic structure at the main chain (hereinafter sometimes referred to as "(a1) polycarbonate polyol") used in the present invention is preferably 400 to 4000, more preferably 400 to 3000, further preferably 400 to 1500, and particularly preferably 500 to 1300. If the number average molecular weight of (a1) the polycarbonate polyol is too small, it is poor in the characteristics as a soft segment, and when a coating film is formed by using the obtained aqueous polyurethane resin dispersion, cracks tend to be caused. If the number average molecular weight of (a1) the polycarbonate polyol is too large, reactivity of (a1) the polycarbonate polyol and the isocyanate compound is lowered, so that it takes a longer time in the preparation step of the urethane prepolymer, or the reaction does not proceed sufficiently in some cases, whereby the viscosity of (a1) the polycarbonate polyol becomes high and handling thereof becomes difficult in some cases.

In the present invention, the number average molecular weight is obtained by measuring a hydroxyl value according to JIS K 1557, and calculated from (56.1×1000×2)/hydroxyl value (mg KOH/g) according to the end-group analysis.

It is preferred that the number average molecular weight of the above-mentioned (a1) polycarbonate polyol is smaller than the number average molecular weight of (a2) the polymer polyol having no alicyclic structure (hereinafter sometimes referred to as "(a2) polymer polyol").

When the number average molecular weight of the above-mentioned (a1) polycarbonate polyol is larger than the number average molecular weight of the above-mentioned (a2) polymer polyol, (a1) a polycarbonate polyol having a relatively high-molecular weight is used, or (a2) a polymer polyol having a relatively low-molecular weight is used. When (a1) the polycarbonate polyol having a relatively high-molecular weight is used, a viscosity of the polycarbonate polyol becomes high, so that there is sometimes a case where the material is difficult to handling. Also, when (a2) the polymer polyol having a relatively low-molecular weight is used, a number of the urethane bondings becomes large, so that drying property of the coating film using the obtained aqueous polyurethane resin dispersion becomes poor in some cases, whereby an aqueous polyurethane resin dispersion which can provide a hard film cannot be obtained in some cases.

(a1) The polycarbonate polyol may be mentioned, for example, a polycarbonate polyol obtained by reacting a polyol having an alicyclic structure at the main chain and a carbonic acid ester compound, and a polycarbonate polyol obtained by reacting a polyol having an alicyclic structure at the main chain, other polyol(s) and a carbonic acid ester compound, etc.

In the present invention, the alicyclic structure also includes those having a hetero atom(s) such as an oxygen atom and nitrogen atom, etc., in the ring.

The above-mentioned polyol having an alicyclic structure at the main chain is not specifically limited, and may be mentioned, for example, a diol having an alicyclic structure at the main chain such as 1,4-cyclohexane dimethanol, 1,3-cyclohexane dimethanol, 1,4-cyclohexanediol, 1,3-cyclopentanediol, 1,4-cycloheptanediol, 2,5-bis-(hydroxymethyl)-1,4-dioxane, 2,7-norbornanediol, tetrahydrofuran dimethanol, 1,4-bis(hydroxyethoxy)cyclohexane, and various structural isomers of tricyclodecane dimethanols represented by tricyclo[5.2.1.0$^{2,6}$]decane dimethanol or a mixture thereof, etc., and among them, 1,4-cyclohexane dimethanol is preferable because of availability.

Also, the other polyols may be mentioned, for example, a polyol having no alicyclic structure such as aliphatic and aromatic diols including 1,6-hexanediol, 1,5-pentanediol, 2-ethyl-1,6-hexanediol, 1,4-butanediol, 1,9-nonanediol, 3-methyl-1,5-pentanediol, 2-methyl-1,8-octanediol, diethylene glycol, triethylene glycol, tetraethylene glycol, 1,4-benzenedimethanol, etc.

The above-mentioned carbonic acid ester compound is not particularly limited, and there may be mentioned, for example, an aliphatic carbonic acid ester compound such as dimethyl carbonate, diethyl carbonate, etc., an aromatic carbonic acid ester compound such as diphenyl carbonate, etc., and a cyclic carbonic acid ester compound such as ethylene carbonate, etc. Also, phosgene which can produce the similar polycarbonate polyol can be also used. Among these, in the point that the above-mentioned polycarbonate polyol can be easily produced, an aliphatic carbonic acid ester compound is preferred, and dimethyl carbonate is particularly preferred.

For the aqueous polyurethane resin dispersion of the present invention to provide a hard coating film, it is important to have an alicyclic structure at the polyol portion which is a soft segment.

In the present invention, a ratio of the alicyclic structure in the above-mentioned (a1) polycarbonate polyol is preferably 10 to 65% by weight, more preferably 15 to 55% by weight, and particularly preferably 25 to 50% by weight. If the ratio of the alicyclic structure is too large, drying property of the obtained aqueous polyurethane resin dispersion is sometimes lowered. Also, if the ratio of the alicyclic structure is too small, hardness of the coating film provided by the obtained aqueous polyurethane resin dispersion is sometimes lowered.

In the present invention, the ratio of the alicyclic structure means a cyclohexane residue (in case of 1,4-hexanedimethanol, the portion at which two hydrogen atoms are eliminated from the cyclohexane) or a tetrahydrofuran residue (in case of tetrahydrofurandimethanol, the portion at which two hydrogen atoms are eliminated from the tetrahydrofuran).

(a2) Polymer Polyol Having Number Average Molecular Weight of 500 to 5000 and Having No Alicyclic Structure (a2) The polymer polyol having a number average molecular weight of 500 to 5000 and having no alicyclic structure used in the present invention is not particularly limited, and there may be mentioned, for example, polycarbonate polyol, polyester polyol, polyether polyol, poly(meth)acrylic polyol, polydiene polyol, etc.

The above-mentioned polycarbonate polyol is not particularly limited, and there may be mentioned, for example, a polycarbonate polyol obtained by reacting a polyol having no alicyclic structure at the main chain and a carbonic acid ester compound. The polyols having no alicyclic structure at the main chain may be mentioned, for example, 1,6-hexanediol, 1,5-pentanediol, 2-ethyl-1,6-hexanediol, 1,4-butanediol, 1,9- nonanediol, 3-methyl-1,5-pentanediol, 2-methyl-1,8-octanediol, diethylene glycol, triethylene glycol, tetraethyleneglycol, 1,4-benzenedimethanol, etc. The above-mentioned polyols having no alicyclic structure at the main chain may be used a single kind alone, or a plural kind thereof in combination.

The above-mentioned carbonic acid ester compound is not particularly limited, and there may be mentioned, for example, an aliphatic carbonic acid ester compound such as dimethyl carbonate, diethyl carbonate, etc., an aromatic carbonic acid ester compound such as diphenyl carbonate, etc., and a cyclic carbonic acid ester compound such as ethylene carbonate, etc. Also, phosgene which can form the similar polycarbonate polyol can be used. Among these, an aliphatic carbonic acid ester compound is preferred in the point of easiness in preparing the above-mentioned polycarbonate polyol, and dimethyl carbonate is particularly preferred.

The above-mentioned polyester polyol is not particularly limited, and there may be mentioned, for example, polyethylene adipate polyol, polybutylene adipate polyol, polyethylene butylene adipate polyol, polyhexamethylene isophthalate adipate polyol, polyethylene succinate polyol, polybutylene succinate polyol, polyethylene sebacate polyol, polybutylene sebacate polyol, poly-ε-caprolactone polyol, poly(3-methyl-1,5-pentylene adipate)polyol, etc.

The above-mentioned polyether polyol is not particularly limited, and there may be mentioned, for example, polyethylene glycol, polypropylene glycol, polytetramethylene glycol, a random copolymer or block copolymer of ethylene oxide and propylene oxide, and of ethylene oxide and butylene oxide, etc.

Further, a polyether polyester polyol having an ether bond and an ester bond, etc., may be used.

The above-mentioned poly(meth)acrylic polyol is not particularly limited, and there may be mentioned, for example, a homopolymer or a copolymer of a (meth)acrylic acid ester(s) having a hydroxyl group(s).

The above-mentioned (meth)acrylic polyol can be obtained by copolymerizing a compound(s) having a polymerizable unsaturated bond(s) in addition to the (meth)acrylic acid ester(s) having a hydroxyl group(s).

The above-mentioned (meth)acrylic acid ester(s) having a hydroxyl group(s) may be mentioned, for example, hydroxy (meth)acrylic acid esters such as 2-hydroxyethyl acrylate, 2-hydroxypropyl acrylate, 2-hydroxybutyl acrylate, 3-hydroxypropyl (meth)acrylate, 4-hydroxybutyl (meth)acrylate, etc., or a (meth)acrylic acid monoester(s) of glycerin, a (meth)acrylic acid monoester(s) of trimethylolpropane, etc.

The above-mentioned compound having a polymerizable unsaturated bond(s) may be mentioned, for example, (meth)acrylic acid esters such as methyl (meth)acrylate, ethyl (meth)acrylate, isopropyl (meth)acrylate, n-butyl (meth)acrylate, isobutyl methacrylate, n-hexyl methacrylate, lauryl methacrylate, glycidyl (meth)acrylate, 2-ethylhexyl (meth)acrylate, etc; unsaturated carboxylic acids such as (meth)acrylic acid, maleic acid, itaconic acid, etc.; unsaturated amides such as acrylamide, N-methylol acrylamide, diacetone acrylamide, etc.; and other polymerizable monomers such as styrene, vinyl toluene, vinyl acetate, acrylonitrile, dibutyl fumarate, etc.

The polymerization method of the above-mentioned (meth)acrylic acid ester(s) having a hydroxyl group(s) or the above-mentioned compound(s) having a polymerizable unsaturated bond(s) may be mentioned an emulsion polymerization, suspension polymerization, dispersion polymerization, solution polymerization, etc. The above-mentioned emulsion polymerization can be carried out the polymerization stepwisely.

Specific examples of the above-mentioned commercially available polyacrylic polyol may be mentioned, for example, "ARUFON UH2000, UH2041, UH2032 and UHE2012" available from TOAGOSEI CO., LTD., and "ACTFLOW UT-1001, UT-3001, UMB-2005 and UMBE-2005" available from Soken Chemical & Engineering Co., Ltd.", etc.

The above-mentioned polydiene polyol is not particularly limited, and there may be mentioned a polydiene polyol containing a unit derived from butadiene, isoprene, 1,3-pentadiene, chloroprene, cyclopentadiene, etc. Specific examples of the above-mentioned polydiene polyol may be mentioned, for example, a hydroxyl-terminated liquid polybutadiene ("Poly bd" available from Idemitsu Kosan Co., Ltd.), a bifunctional hydroxyl-terminated liquid polybutadiene ("KRASOL" available from Idemitsu Kosan Co., Ltd.), a hydroxyl-terminated liquid polyisoprene ("Poly ip" available from Idemitsu Kosan Co., Ltd.) and a hydroxyl-terminated liquid polyolefin ("EPOL" available from Idemitsu Kosan Co., Ltd.), etc.

The above-mentioned (a2) polymer polyol may be used a single kind alone or may be used a plural kind of materials in combination.

It is desired that the above-mentioned polymer polyol having a molecular weight of 500 to 5000 and having no alicyclic structure preferably has a number average molecular weight of 500 to 3000. When the above-mentioned number average molecular weight is less than 500, its characteristics are inferior as a soft segment, and the drying property of the coating film provided by the obtained aqueous polyurethane resin dispersion is lowered. If it exceeds 3000, reactivity between the polyol and the isocyanate compound is lowered so that there is a case where the reaction does not proceed sufficiently, and storage stability of the obtained aqueous polyurethane resin becomes worse.

The above-mentioned polymer polyol having a number average molecular weight of 500 to 5000 and having no alicyclic structure is preferably a polyether polyol in the viewpoint of drying property of the resulting coating film which is provided by the obtained aqueous polyurethane resin dispersion. For example, there may be mentioned polytetramethylene glycol, polyethylene glycol, polypropylene glycol, a random copolymer or block copolymer of ethylene oxide and propylene oxide, and of ethylene oxide and butylene oxide, etc.

((a) Polyol Compound)

The (a) polyol compound used in the present invention contains the above-mentioned (a1) polycarbonate polyol and the above-mentioned (a2) polymer polyol.

In the (a) polyol compound used in the present invention, a weight ratio (a1/a2) of the above-mentioned (a1) polycarbonate polyol and the above-mentioned (a2) polymer polyol is preferably 99/1 to 3/97, more preferably 99/1 to 25/75, particularly preferably 99/1 to 50.1/49.9, and further preferably 99/1 to 85/15.

If the ratio of the above-mentioned (a2) polymer polyol is too little, drying property of the obtained aqueous polyurethane resin dispersion is lowered in some cases. Also, if the ratio of the above-mentioned (a2) polymer polyol is too much, hardness of the coating film provided by the obtained aqueous polyurethane resin dispersion is lowered in some cases.

A number average molecular weight of the above-mentioned (a2) polymer polyol is preferably larger than number average molecular weight: the above-mentioned (a1) polycarbonate polyol. According to this, hardness of the film dried within a short period of time using the aqueous polyurethane resin dispersion becomes high.

(a3) Low-Molecular Weight Polyol

In the present invention, as (a) the polyol compound, (a3) a low-molecular weight polyol having a molecular weight of less than 500 may be used in combination in addition to the above-mentioned (a1) polycarbonate polyol and the above-mentioned (a2) polymer polyol.

The above-mentioned (a3) low-molecular weight polyol is not particularly limited, and there may be mentioned, for example, aliphatic and aromatic diols with a carbon number of 2 to 9 such as ethylene glycol, 1,3-propanediol, 2-methyl-1,3-propanediol, 2,2-dimethyl-1,3-propanediol, 2-butyl-2-ethyl-1,3-propanediol, 1,4-butanediol, 1,5-pentanediol, 3-methyl-1,5-pentanediol, 1,6-hexanediol, 1,9-nonanediol, 2-methyl-1,8-octanediol, diethylene glycol, triethylene glycol, tetraethyleneglycol, 1,4-benzenedimethanol, etc.; diols having an alicyclic structure with a carbon number of 6 to 12 such as 1,4-cyclohexanedimethanol, 1,3-cyclohexanedimethanol, 1,4-cyclohexanediol, 1,4-bis(hydroxyethyl)cyclohexane, 2,7-norbornanediol, tetrahydrofurandimethanol, 2,5-bis(hydroxymethyl)-1,4-dioxane, etc. Also, as the above-mentioned low-molecular weight polyol, there may be used a low-molecular weight polyvalent alcohol such as trimethylolpropane, pentaerythritol, sorbitol, etc.

The above-mentioned (a3) low-molecular weight polyol may be used a single kind alone or may be used in combination of a plural kinds.

((b) Polyisocyanate Compound)

The polyisocyanate compound which can be used in the present invention is not particularly limited, and there may be specifically mentioned an aromatic polyisocyanate compound such as 1,3-phenylene diisocyanate, 1,4-phenylene diisocyanate, 2,4-tolylene diisocyanate (TDI), 2,6-tolylene diisocyanate, 4,4'-diphenylenemethane diisocyanate (MDI), 2,4-diphenylmethane diisocyanate, 4,4'-diisocyanatebiphenyl, 3,3'-dimethyl-4,4'-diisocyanatebiphenyl, 3,3'-dimethyl-4,4'-diisocyanatediphenylmethane, 1,5-naphthylenediisocyanate, 4,4',4''-triphenylmethane triisocyanate, m-isocyanatephenylsulfonyl isocyanate, p-isocyanatephenylsulfonyl isocyanate, etc.; an aliphatic polyisocyanate compound such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatemethyl caproate, bis(2-isocyanatoethyl)fumarate, bis(2-isocyanatoethyl)-carbonate, 2-isocyanatoethyl-2,6-diisocyanatehexanoate, etc.; an alicyclic polyisocyanate compound such as isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5-norbornane diisocyanate, 2,6-norbornane diisocyanate, etc. These polyisocyanate compounds may be used one kind alone, or may be used two kinds or more in combination.

A number of the isocyanate group of the above-mentioned polyisocyanate compound per one molecule is usually 2, and a polyisocyanate having 3 or more isocyanate groups such as triphenylmethane triisocyanate may be used within the range that the polyurethane resin of the present invention is not gelled.

Among the above-mentioned polyisocyanate compounds, 4,4'-diphenylenemethane diisocyanate (MDI), isophorone diisocyanate (IPDI) and 4,4'-dicyclohexylmethane diisocyanate (hydrogenated MDI) are preferred in the viewpoints of controlling the reactivity and providing strength, etc.

((c) Acidic Group-Containing Polyol Compound)

The acidic group-containing polyol compound used in the present invention preferably contains a compound having 2 or more hydroxyl groups and 1 or more carboxyl groups in one molecule, and more preferably contains a compound having 2 hydroxyl groups and 1 carboxyl group in one molecule. The above-mentioned acidic group-containing polyol compound may be used one kind alone, or may be used two kinds or more in combination.

Also, as the above-mentioned acidic group-containing polyol compound, a polyol compound having a sulfonic acid group, phosphoric acid group or phenolic hydroxyl group as the acidic group may be contained other than the above-mentioned compound having 2 or more hydroxyl groups and 1 or more carboxyl groups in one molecule.

The acidic group-containing polyol compound which can be used in the present invention can be specifically mentioned dimethylolalkanoic acids such as 2,2-dimethylol propionic acid, 2,2-dimethylolbutanoic acid, etc., N,N-bishydroxyethyl-glycine, N,N-bishydroxyethylalanine, 3,4-dihydroxybutanesulfonic acid, 3,6-dihydroxy-2-toluenesulfonic acid, acidic group-containing polyether polyol, acidic group-containing polyester polyol, etc. Among these, in the viewpoint of availability, dimethylolalkanoic acid is preferred, and 2,2-dimethylol propionic acid is more preferred.

The acidic group-neutralizing agent may be mentioned organic amines such as trimethylamine, triethylamine, triisopropylamine, tributylamine, triethanolamine, N-methyldiethanolamine, N-phenyldiethanolamine, dimethylethanolamine, diethylethanolamine, N-methylmorpholine, pyridine, etc.; inorganic alkalis such as sodium hydroxide, potassium hydroxide, etc., and ammonia, etc. Among the above-mentioned materials, preferred are organic amines, more preferred is a tertiary amine, and most preferred is triethylamine.

((d) Chain-Elongating Agent)

The (d) chain-elongating agent may be mentioned a compound having reactivity with an isocyanate group. There may be mentioned, for example, amine compounds such as ethylenediamine, 1,4-tetramethylenediamine, 2-methyl-1,5-pentanediamine, 1,4-butanediamine, 1,6-hexamethylenediamine, 1,4-hexamethylenediamine, 3-aminomethyl-3,5,5-trimethylcyclohexylamine, 1,3-bis(aminomethyl)cyclohexane, xylylenediamine, piperazine, adipoyl hydrazide, hydrazine, 2,5-dimethylpiperazine, diethylene triamine, triethylene tetramine, etc., diol compounds such as ethylene glycol, propylene glycol, 1,4-butanediol, 1,6-hexanediol, etc., polyalkylene glycols represented by polyethylene glycol, and water, etc., and among these, a primary diamine compound is preferably mentioned. These may be used alone, or may be used two kinds or more in combination.

(Aqueous Medium)

The above-mentioned aqueous medium may be mentioned water or a mixed medium of water and a hydrophilic organic solvent, etc.

The above-mentioned water may be mentioned, for example, tap water, ion exchanged water, distilled water, ultrapure water, etc., and preferably deionized water in view of availability and the fact of particles becoming unstable under the influence of salts.

The above-mentioned hydrophilic organic solvent may be mentioned a lower monovalent alcohol such as methanol, ethanol, propanol, etc.; a polyvalent alcohol such as ethylene glycol, glycerin, etc.; an aprotic hydrophilic organic solvent such as N-methylmorpholine, dimethylsulfoxide, dimethylformamide, N-methylpyrrolidone, N-ethylpyrrolidone, acetone, tetrahydrofuran, etc.

An amount of the above-mentioned hydrophilic organic solvent in the above-mentioned aqueous medium is preferably 0 to 20% by weight.

In the present invention, an end-terminating agent may be used, if necessary. Specific examples of the end-terminating agent may be mentioned, for example, a monoamine such as n-butylamine, di-n-butylamine, diethanolamine, etc.; a monovalent alcohol such as ethanol, isopropanol, butanol, etc., and these end-terminating agents may be used alone or two or more kinds in combination. It may be used in combination with the aforementioned chain-elongating agent.

The aqueous polyurethane resin of the present invention can be obtained by reacting these components by the conventionally known method, and a number average molecular weight of the said aqueous polyurethane resin is generally 5000 to 200,000 or so. A ratio of the polyurethane resin in the aqueous polyurethane resin dispersion is preferably 5 to 60% by weight, more preferably 20 to 50% by weight.

(Paint Composition and Coating Agent)

The paint composition and coating agent of the present invention are paint composition and coating agent containing the above-mentioned aqueous polyurethane resin dispersion.

To the paint composition and coating agent of the present invention, other resins can be added which are resins other than the above-mentioned aqueous polyurethane resin dispersion. The above-mentioned other resins may be mentioned a polyester resin, acrylic resin, polyether resin, polycarbonate resin, polyurethane resin, epoxy resin, alkyd resin, and polyolefin resin, etc. These may be used alone, or may be used two kinds or more in combination.

Also, the above-mentioned other resins preferably have one or more hydrophilic groups. The above-mentioned hydrophilic group may be mentioned a hydroxyl group, carboxyl group, sulfonic acid group, etc.

The above-mentioned other resins are preferably at least one selected from the group consisting of a polyester resin, acrylic resin and polyolefin resin.

Also, when the above-mentioned polyester resin and the above-mentioned acrylic resin have a hydroxyl group, the so-called urethane-modified polyester resin or urethane-modified acrylic resin in which a part or whole of the hydroxyl groups in the resin and a polyisocyanate compound are subjected to urethanization reaction to elongate these resins to make high molecular weight may be used in combination.

The above-mentioned polyester resin can be generally prepared by an esterification reaction or transesterification reaction of an acid component and an alcohol component.

The above-mentioned acid component can be used a compound which is generally used as an acid component for the preparation of a polyester resin. The acid component can be used, for example, an aliphatic polybasic acid, alicyclic polybasic acid, aromatic polybasic acid, etc.

A hydroxyl value of the above-mentioned polyester resin is preferably 10 to 300 mg KOH/g or so, more preferably 50 to 250 mg KOH/g or so, further preferably 80 to 180 mg KOH/g or so. An acid value of the above-mentioned polyester resin is preferably 1 to 200 mg KOH/g or so, more preferably 15 to 100 mg KOH/g or so, further preferably 25 to 60 mg KOH/g or so.

A weight average molecular weight of the above-mentioned polyester resin is preferably 500 to 500,000, more preferably 1,000 to 300,000, further preferably 1,500 to 200,000.

The above-mentioned acrylic resin is preferably a hydroxyl group-containing acrylic resin. The above-mentioned hydroxyl group-containing acrylic resin can be prepared by polymerizing a hydroxyl group-containing polymerizable unsaturated monomer and copolymerizing the hydroxyl group-containing polymerizable unsaturated monomer and a copolymerizable other polymerizable unsaturated monomer(s) by the conventionally known method, for example, the solution polymerization method in an organic solvent, the emulsion polymerization method in water, etc.

The above-mentioned hydroxyl group-containing polymerizable unsaturated monomer is a compound having both one or more hydroxyl group(s) and polymerizable unsaturated bond(s) in one molecule. There may be mentioned, for example, monoesterified products of a (meth)acrylic acid and a divalent alcohol with a carbon number of 2 to 8, such as 2-hydroxyethyl (meth)acrylate, 2-hydroxypropyl (meth)acrylate, 3-hydroxypropyl (meth)acrylate, 4-hydroxybutyl (meth)acrylate, etc.; ε-caprolactone-modified products of these monoesterified products; N-hydroxymethyl (meth)acrylamide; allyl alcohol; a (meth)acrylate having a polyoxyethylene chain the molecular ends of which are hydroxyl group(s), etc.

The above-mentioned hydroxyl group-containing acrylic resin preferably contains an anionic functional group.

The hydroxyl group-containing acrylic resin having an anionic functional group can be prepared by, for example, using a polymerizable unsaturated monomer having an anionic functional group such as a carboxylic acid group, sulfonic acid group, phenol group, etc., as one of the above-mentioned polymerizable unsaturated monomers.

The hydroxyl value of the above-mentioned hydroxyl group-containing acrylic resin is preferably 1 to 200 mg KOH/g or so, more preferably 2 to 100 mg KOH/g or so, and further preferably 3 to 60 mg KOH/g or so in the viewpoints of storage stability and water resistance of the resulting coating film, etc.

When the hydroxyl group-containing acrylic resin has an acidic group such as a carboxyl group, etc., an acid value of said hydroxyl group-containing acrylic resin is preferably 1 to 200 mg KOH/g or so in the viewpoint of water resistance, etc., of the obtained coating film, more preferably 2 to 150 mg KOH/g or so, and further preferably 5 to 100 mg KOH/g or so.

A weight average molecular weight of the above-mentioned hydroxyl group-containing acrylic resin is preferably 1,000 to 200,000, more preferably 2,000 to 100,000, further preferably within the range of 3,000 to 50,000.

The above-mentioned polyether resin may be mentioned a polymer or copolymer having an ether bond, and for example, a polyoxyethylene series polyether, polyoxypropylene series polyether, polyoxybutylene series polyether, a polyether derived from an aromatic polyhydroxy compound such as bisphenol A or bisphenol F, etc., may be mentioned.

The above-mentioned polycarbonate resin may be mentioned a polymer produced by a bisphenol compound, and, for example, bisphenol A polycarbonate, etc., may be mentioned.

The above-mentioned polyurethane resin may be mentioned a resin having a urethane bond obtained by the reaction of various kinds of polyol component(s) such as acryl, polyester, polyether, polycarbonate, etc., and a polyisocyanate compound.

The above-mentioned epoxy resin may be mentioned a resin obtained by the reaction of a bisphenol compound and epichlorohydrin, etc. The bisphenol may be mentioned, for example, bisphenol A and bisphenol F.

The above-mentioned alkyd resin may be mentioned an alkyd resin obtained by reacting a polybasic acid such as phthalic acid, terephthalic acid, succinic acid, etc., with a polyvalent alcohol, and further reacting a modifier such as oil and fats, oil and fats fatty acid (soybean oil, linseed oil, coconut oil, stearic acid, etc.), natural resin (rosin, amber, etc.), etc.

The polyolefin resin may be mentioned a resin obtained by emulsifying a polyolefin resin which can be obtained by polymerizing an olefin type monomer or copolymerizing it with other monomer(s) optionally according to the usual polymerization method, using an emulsifier in water, or by subjecting to emulsion polymerization of an olefin type monomer(s) with other monomer(s) optionally. Also, in some cases, the so-called chlorinated polyolefin-modified resin in which the above-mentioned polyolefin resin is chlorinated may be used.

The olefin type monomer may be mentioned, for example, α-olefins such as ethylene, propylene, 1-butene, 3-methyl-1-butene, 4-methyl-1-pentene, 3-methyl-1-pentene, 1-heptene, 1-hexene, 1-decene, 1-dodecene, etc.; conjugate diene or unconjugated diene such as butadiene, ethylidene norbornene, dicyclopentadiene, 1,5-hexadiene, styrenes, etc., and these monomers may be used each material alone, or may be used two kinds or more in combination.

The olefin type monomer and the copolymerizable other monomer may be mentioned, for example, vinyl acetate, vinyl alcohol, maleic acid, citraconic acid, itaconic acid, maleic anhydride, citraconic anhydride, itaconic anhydride, etc., and these monomers may be used one kind alone, or may be used two kinds or more in combination.

By adding a curing agent to the paint composition and coating agent of the present invention, water resistance, etc., of the coating film or multi-layer coating film, or a paint film prepared by using the above-mentioned paint composition or coating agent can be improved.

The above-mentioned curing agent may be used, for example, an amino resin, polyisocyanate compound, blocked polyisocyanate compound, melamine resin, carbodiimide, etc. The above-mentioned curing agent may be used one kind alone, or may be used two kinds or more in combination.

The above-mentioned amino resin may be used, for example, a partially or completely methylolated amino resin obtained by the reaction of an amino component and an aldehyde component. The above-mentioned amino component may be mentioned, for example, melamine, urea, benzoguanamine, acetoguanamine, steroguanamine, spiroguanamine, dicyanediamide, etc. The aldehyde component may be mentioned, for example, formaldehyde, paraformaldehyde, acetaldehyde, benzaldehyde, etc.

The above-mentioned polyisocyanate compound may be mentioned, for example, a compound having 2 or more isocyanate groups in one molecule, and specifically mentioned, for example, hexamethylene diisocyanate, trimethylhexamethylene diisocyanate, etc.

The above-mentioned blocked polyisocyanate compound may be mentioned those obtained by adding a blocking agent to the polyisocyanate group of the above-mentioned polyisocyanate compound, and the blocking agent may be mentioned a phenol type blocking agent such as phenol, cresol, etc., aliphatic alcohol type one such as methanol, ethanol, etc., active methylene type one such as dimethyl malonate, acetyl acetone, etc., mercaptane type one such as butyl mercaptane, dodecyl mercaptane, etc., acid amide type one such as acetanilide, acetic amide, etc., lactam type one such as ε-caprolactam, δ-valerolactam, etc., acid imide type one such as succinimide, maleimide, etc., oxime type one such as acetaldoxime, acetoneoxime, methyl ethyl ketoxime, etc., and amine type one such as diphenylaniline, aniline, ethyleneimine, etc.

The above-mentioned melamine resin may be mentioned, for example, methylolmelamines such as dimethylolmelamine, trimethylolmelamine, etc.; alkyl etherified products or condensates of these methylolmelamines; condensates of the alkyl etherified products of methylolmelamines, etc.

To the paint composition and coating agent of the present invention, a colored pigment, an extender pigment and/or a lustrous pigment may be added.

The above-mentioned colored pigment may be mentioned, for example, titanium oxide, zinc white, carbon black, molybdenum red, Prussian blue, cobalt blue, azo pigment, phthalocyanine pigment, quinacridone pigment, isoindoline pigment, threne-based pigment, perylene pigment, etc. These may be used singly or two more kinds in combination. In particular, it is preferred to use titanium oxide and/or carbon black as the colored pigment.

The above-mentioned extender pigment may be mentioned, for example, clay, kaolin, barium sulfate, barium carbonate, calcium carbonate, talc, silica, alumina white, etc. These may be used singly or two more kinds in combination. In particular, it is preferred to use barium sulfate and/or talc as the extender pigment, and it is more preferred to use barium sulfate.

The above-mentioned photoluminescent pigment may be mentioned, for example, aluminum, copper, zinc, brass, nickel, aluminum oxide, mica, aluminum oxide coated by titanium oxide or iron oxide, mica coated by titanium oxide or iron oxide, etc.

The paint composition and coating agent of the present invention can contain an additive(s) for usual paint such as a thickening agent, curing catalyst, UV absorber, photostabilizer, defoaming agent, plasticizer, surface adjuster, anti-sediment agent, etc., singly or two or more kinds in combination, if necessary.

The preparation method of the paint composition and coating agent of the present invention is not particularly limited, and a conventionally known preparation method may be employed. In general, the paint composition and coating agent can be prepared by mixing the above-mentioned aqueous polyurethane resin dispersion with the above-mentioned various kinds of additives, adding an aqueous medium, and regulating the viscosity suitable for the coating method.

The material to be coated by the paint composition or the material to be coated by the coating agent may be mentioned a metal, plastic, inorganic material, etc.

The coating method of the paint composition or the coating method of the coating agent may be mentioned a bell coating, spray coating, roll coating, shower coating, dip coating, etc.

(Preparation Method of the Aqueous Polyurethane Resin Dispersion)

Preparation method of the aqueous polyurethane resin dispersion according to the present invention is not specifically limited, and may be mentioned, for example, the following preparation methods.

The first preparation method is a method in which all the starting materials are mixed and reacted, and the product is dispersed in an aqueous medium to obtain an aqueous polyurethane resin dispersion.

The second preparation method is a method in which a polyol and a polyisocyanate are reacted to prepare a prepolymer, then, the acidic group of the above-mentioned prepolymer is neutralized, the product is dispersed in an aqueous medium, and a chain-elongating agent is reacted to obtain an aqueous polyurethane resin dispersion.

As the preparation method of the aqueous polyurethane resin dispersion according to the present invention, the above-mentioned second preparation method is preferred since control of the molecular weight can be carried out easily.

The above-mentioned second preparation method comprises Step (α) of obtaining a prepolymer by reacting (a) a polyol compound which contains (a1) a polycarbonate polyol having an alicyclic structure at the main chain, (a2) a polymer polyol having number average molecular weight of 500 to 5000 and having no alicyclic structure and optionally (a3) a low-molecular weight polyol, (b) a polyisocyanate compound and (c) an acidic group-containing polyol, Step (β) of neutralizing the acidic group in the above-mentioned prepolymer, Step (γ) of dispersing the neutralized prepolymer in an aqueous medium, and Step (δ) of reacting the prepolymer dispersed in the aqueous medium and (d) a chain-elongating agent.

When (a) the polyol compound containing (a1) the polycarbonate polyol, (a2) the polymer polyol and optionally (a3) the low-molecular weight polyol, (b) the polyisocyanate compound and (c) the acidic group-containing polyol are reacted, a catalyst may be used.

The above-mentioned catalyst is not particularly limited, and may be mentioned, for example, a salt of a metal and an organic or inorganic acid such as a tin series catalyst (trimethyl tin laurate, dibutyl tin dilaurate, etc.) and a lead series catalyst (lead octylate, etc.), etc., and an organometal derivative, amine series catalyst (triethylamine, N-ethylmorpholine, triethylene diamine, etc.), diazabicycloundecene series catalyst, etc. Among these, dibutyl tin dilaurate is preferred in the viewpoint of reactivity.

Step (γ) of dispersing the above-mentioned neutralized prepolymer in an aqueous medium, and Step (δ) of reacting the above-mentioned prepolymer and (d) a chain-elongating agent may be carried out simultaneously.

EXAMPLES

In the following, Examples are shown but the present invention is not limited by these.

Example 1

In a reaction device equipped with a stirrer and a heater, ETERNACOLL UM90 (3/1) (available from UBE INDUSTRIES, LTD.; number average molecular weight: 916; hydroxyl value: 123 mg KOH/g; polycarbonate diol (ratio of alicyclic structure: 38.7% by weight) obtained by reacting a polyol mixture wherein the polyol component is 1,4-cyclohexanedimethanol:1,6-hexanediol=3:1 in a molar ratio with a carbonic acid ester, 159 g), polytetramethylene glycol (PTMG, number average molecular weight: 2030, 17.8 g), 2,2-dimethylol propionic acid (24.6 g) and hydrogenated MDI (163 g) were heated in NMP (N-methyl-2-pyrrolidone, 155 g) in the presence of dibutyl tin dilaurate (0.3 g) under nitrogen atmosphere at 80-90° C. for 6 hours. The NCO group content at the time of termination of the urethanization reaction was 3.93% by weight. The reaction mixture was cooled to 80° C., and triethylamine (18.4 g) was added thereto and mixed. Among the obtained product, 400 g of the product was taken out, and added into water (716 g) under vigorous stirring. Then, 35% by weight 2-methyl-1,5-pentanediamine aqueous solution (56.9 g) was added to the mixture to obtain an aqueous polyurethane resin dispersion.

Example 2

In a reaction device equipped with a stirrer and a heater, ETERNACOLL UC100 (available from UBE INDUSTRIES, LTD.; number average molecular weight: 1030; hydroxyl value: 109 mg KOH/g; polycarbonate diol (the ratio of alicyclic structure: 49.5% by weight) obtained by reacting 1,4-cyclohexanedimethanol with a carbonic acid ester, 160 g), PTMG (number average molecular weight: 2030, 18.7 g), 2,2-dimethylol propionic acid (22.1 g) and hydrogenated MDI (147 g) were heated in NMP (146 g) in the presence of dibutyl tin dilaurate (0.2 g) under nitrogen atmosphere at 80-90° C. for 6 hours. The NCO group content at the time of termination of the urethanization reaction was 3.71% by weight. The reaction mixture was cooled to 80° C., and triethylamine (16.7 g) was added thereto and mixed. Among the obtained product, 330 g of the product was taken out, and added into water (622 g) under vigorous stirring. Then, 35% by weight 2-methyl-1,5-pentanediamine aqueous solution (46.7 g) was added to the mixture to obtain an aqueous polyurethane resin dispersion.

Example 3

In a reaction device equipped with a stirrer and a heater, ETERNACOLL UC100 (available from UBE INDUSTRIES, LTD.; number average molecular weight: 964; hydroxyl value: 116 mg KOH/g; polycarbonate diol (the ratio of alicyclic structure: 49.5% by weight) obtained by reacting 1,4-cyclohexanedimethanol with a carbonic acid ester, 85.2 g), PTMG (number average molecular weight: 971, 84.7 g), 1,4-butanediol (1.0 g), 2,2-dimethylol propionic acid (25.0 g) and hydrogenated MDI (165 g) were heated in NMP (152 g) in the presence of dibutyl tin dilaurate (0.3 g) under nitrogen atmosphere at 80-90° C. for 6 hours. The NCO group content at the time of termination of the urethanization reaction was 4.10% by weight. The reaction mixture was cooled to 80° C., and triethylamine (18.8 g) was added thereto and mixed. Among the obtained product, 485 g of the product was taken out, and added into water (757 g) under vigorous stirring. Then, 35% by weight 2-methyl-1,5-pentanediamine aqueous solution (66.7 g) was added to the mixture to obtain an aqueous polyurethane resin dispersion.

Example 4

In a reaction device equipped with a stirrer and a heater, ETERNACOLL UC100 (available from UBE INDUSTRIES, LTD.; number average molecular weight: 964; hydroxyl value: 116 mg KOH/g; polycarbonate diol (the ratio of alicyclic structure: 49.5% by weight) obtained by reacting 1,4-cyclohexanedimethanol with a carbonic acid ester, 80.2 g), ETERNACOLL UH100 (available from UBE INDUSTRIES, LTD.; number average molecular weight: 1004; hydroxyl value: 112 mg KOH/g; polycarbonate diol obtained by reacting 1,6-hexanediol with a carbonic acid ester, 20.2 g), 2,2-dimethylol propionic acid (13.8 g) and hydrogenated MDI (92.1 g) were heated in NMP (87.2 g) in the presence of dibutyl tin dilaurate (0.2 g) under nitrogen atmosphere at 80-90° C. for 6 hours. The NCO group content at the time of termination of the urethanization reaction was 3.78% by weight. The reaction mixture was cooled to 80° C., and triethylamine (10.4 g) was added thereto and mixed. Among the obtained product, 257 g of the product was taken out, and added into water (406 g) under vigorous stirring. Then, 35% by weight 2-methyl-1,5-pentanediamine aqueous solution (35.1 g) was added to the mixture to obtain an aqueous polyurethane resin dispersion.

Example 5

In a reaction device equipped with a stirrer and a heater, ETERNACOLL UC100 (available from UBE INDUS- TRIES, LTD.; number average molecular weight: 964; hydroxyl value: 116 mg KOH/g; polycarbonate diol (the ratio of alicyclic structure: 49.5% by weight) obtained by reacting 1,4-cyclohexanedimethanol with a carbonic acid ester, 69.7 g), ETERNACOLL UB100 (3/1) (available from UBE INDUSTRIES, LTD.; number average molecular weight: 1000; hydroxyl value: 112 mg KOH/g; polycarbonate diol obtained by reacting a polyol mixture wherein the polyol component is 1,6-hexanediol:1,4-benzenedimethanol=3:1 in a molar ratio with a carbonic acid ester, 30.9 g), 2,2-dimethylol propionic acid (13.8 g) and hydrogenated MDI (91.8 g) were heated in NMP (86.8 g) in the presence of dibutyl tin dilaurate (0.2 g) under nitrogen atmosphere at 80-90° C. for 6 hours. The NCO group content at the time of termination of the urethanization reaction was 3.91% by weight. The reaction mixture was cooled to 80° C., and triethylamine (10.2 g) was added thereto and mixed. Among the obtained product, 261 g of the product was taken out, and added into water (400 g) under vigorous stirring. Then, 35% by weight 2-methyl-1,5-pentanediamine aqueous solution (36.9 g) was added to the mixture to obtain an aqueous polyurethane resin dispersion.

Example 6

In a reaction device equipped with a stirrer and a heater, ETERNACOLL UC100 (available from UBE INDUSTRIES, LTD.; number average molecular weight: 964; hydroxyl value: 116 mg KOH/g; polycarbonate diol (the ratio of alicyclic structure: 49.5% by weight) obtained by reacting 1,4-cyclohexanedimethanol with a carbonic acid ester, 60.2 g), ARUFON UH2032 (available from TOAGOSEI CO., LTD.; number average molecular weight: about 967; hydroxyl value: 116 mg KOH/g; acrylic polyol, 40.3 g), 2,2-dimethylolpropionic acid (10.3 g) and hydrogenated MDI (92.8 g) were heated in NMP (86.9 g) in the presence of dibutyl tin dilaurate (0.2 g) under nitrogen atmosphere at 80-90° C. for 6 hours. The NCO group content at the time of termination of the urethanization reaction was 3.88% by weight. The reaction mixture was cooled to 80° C., and triethylamine (10.3 g) was added thereto and mixed. Among the obtained product, 257 g of the product was taken out, and added into water (407 g) under vigorous stirring. Then, 35% by weight 2-methyl-1,5-pentanediamine aqueous solution (36.0 g) was added to the mixture to obtain an aqueous polyurethane resin dispersion.

Comparative Example 1

In a reaction device equipped with a stirrer, a reflux condenser and a thermometer, ETERNACOLL UM90 (3/1) (available from UBE INDUSTRIES, LTD.; number average molecular weight: 916; hydroxyl value: 123 mg KOH/g; polycarbonate diol (ratio of alicyclic structure: 38.7% by weight) obtained by reacting a polyol mixture wherein the polyol component is 1,4-cyclohexanedimethanol:1,6-hexanediol=3:1 in a molar ratio with a carbonic acid ester, 1500 g), 2,2-dimethylol propionic acid (220 g) and hydrogenated MDI (1450 g) were heated in NMP (1350 g) in the presence of dibutyl tin dilaurate (2.6 g) under nitrogen atmosphere at 80-90° C. for 6 hours. The NCO group content in the prepolymer at the time of termination of the urethanization reaction was 3.97% by weight. The reaction mixture was cooled to 80° C., and triethylamine (149 g) was added thereto and mixed. Among the obtained product, 4360 g of the product was taken out, and added into water (6900 g) under vigorous stirring. Then, 35% by weight 2-methyl-1,5-pentanediamine aqueous solution (626 g) was added to the mixture to obtain an aqueous polyurethane resin dispersion.

Comparative Example 2

In a reaction device equipped with a stirrer and a heater, ETERNACOLL UC100 (available from UBE INDUSTRIES, LTD.; number average molecular weight: 1000; hydroxyl value: 112 mg KOH/g; polycarbonate diol (ratio of alicyclic structure: 49.5% by weight) obtained by reacting 1,4-cyclohexanedimethanol and carbonic acid ester, 300 g), 2,2-dimethylol propionic acid (40.1 g) and hydrogenated MDI (266 g) were heated in NMP (257 g) in the presence of dibutyl tin dilaurate (0.7 g) under nitrogen atmosphere at 80-90° C. for 6 hours. The NCO group content at the time of termination of the urethanization reaction was 3.86% by weight. The reaction mixture was cooled to 80° C., and triethylamine (30.2 g) was added thereto and mixed. Among the obtained product, 800 g of the product was taken out, and added into water (1320 g) under vigorous stirring. Then, 35% by weight 2-methyl-1,5-pentanediamine aqueous solution (110 g) was added to the mixture to obtain an aqueous polyurethane resin dispersion.

Comparative Example 3

In a reaction device equipped with a stirrer and a heater, PTMG (number average molecular weight: 970, 180 g), 1,4-butanediol (1.2 g), 2,2-dimethylol propionic acid (27.3 g) and hydrogenated MDI (175 g) were heated in NMP (165 g) in the presence of dibutyl tin dilaurate (0.3 g) under nitrogen atmosphere at 80-90° C. for 6 hours. The NCO group content at the time of termination of the urethanization reaction was 3.98% by weight. The reaction mixture was cooled to 80° C., and triethylamine (20.5 g) was added thereto and mixed. Among the obtained product, 535 g of the product was taken out, and added into water (809 g) under vigorous stirring. Then, 35% by weight 2-methyl-1,5-pentanediamine aqueous solution (78.9 g) was added to the mixture to obtain an aqueous polyurethane resin dispersion.

Comparative Example 4

In a reaction device equipped with a stirrer and a heater, ETERNACOLL UH100 (available from UBE INDUSTRIES, LTD.; number average molecular weight: 1011; hydroxyl value: 111 mg KOH/g; polycarbonate diol obtained by reacting 1,6-hexanediol with a carbonic acid ester (ratio of alicyclic structure: 0% by weight), 79.7 g), PTMG (number average molecular weight: 2030, 8.9 g), 1,4-butanediol (1.4 g), 2,2-dimethylol propionic acid (13.2 g) and hydrogenated MDI (87.9 g) were heated in NMP (81.6 g) in the presence of dibutyl tin dilaurate (0.15 g) at 80-90° C. for 6 hours. The NCO group content at the time of termination of the urethanization reaction was 4.00% by weight. The reaction mixture was cooled to 80° C., and triethylamine (9.9 g) was added thereto and mixed. Among the obtained product, 248 g of the product was taken out, and added into water (384 g) under vigorous stirring. Then, 35% by weight 2-methyl-1,5-pentanediamine aqueous solution (35.8 g) was added to the mixture to obtain an aqueous polyurethane resin dispersion.

Comparative Example 5

In a reaction device equipped with a stirrer and a heater, ETERNACOLL UC100 (available from UBE INDUSTRIES, LTD.; number average molecular weight: 964;

hydroxyl value: 116 mg KOH/g; polycarbonate diol (the ratio of alicyclic structure: 49.5% by weight) obtained by reacting 1,4-cyclohexanedimethanol with a carbonic acid ester, 60.1 g), PTMG (number average molecular weight: 2000, 6.6 g), 2,2-dimethylol propionic acid (8.96 g) and hydrogenated MDI (58.2 g) were heated in NMP (55.7 g) in the presence of dibutyl tin dilaurate (0.1 g) under nitrogen atmosphere at 80-90° C. for 6 hours. The NCO group content at the time of termination of the urethanization reaction was 3.70% by weight. The reaction mixture was cooled to 80° C., and triethylamine (6.6 g) was added thereto and mixed. To the obtained product, diethylene glycol ethyl ether acetate (289 g) was added under vigorous stirring. When 2-methyl-1,5-pentane diamine (9.2 g) was added to the mixture, then white solid was precipitated and no urethane solution could be obtained.

(Evaluation of Hardness and Modulus of Elasticity)

They were evaluated by measuring pencil hardness, pendulum hardness, and modulus of elasticity at tensile test of the film.

[Preparation of Samples For Tensile Test]

Each aqueous polyurethane resin dispersion of the above-mentioned Examples 1 to 6 and Comparative examples 1 to 4 was coated uniformly on a glass plate so that the film thickness after drying became about 0.15 mm. Then, they were allowed to stand at room temperature for 16 hours, dried at 60° C. for 1 hour, and then, at 120° C. for 3 hours, and the obtained polyurethane resin film was peeled off from the glass plate and supplied to the following evaluations.

[Measurement of Modulus of Elasticity]

Modulus of elasticity of the above-mentioned polyurethane film was measured by the method according to JIS K 7113.

[Preparation of Samples for Pendulum Hardness 1 and Pencil Hardness]

Each aqueous polyurethane resin dispersion of the above-mentioned Examples 1 to 6 and Comparative examples 1 to 4 was coated uniformly on a glass plate so that the film thickness after drying became about 20 μm. Then, they were dried at 80° C. for 30 minutes, and the obtained polyurethane resin coating films were supplied to evaluations of pencil hardness measurement, and pendulum hardness measurement 1.

[Preparation of Samples for Pendulum Hardness 2]

Each aqueous polyurethane resin dispersion of the above-mentioned Examples 1 to 6 and Comparative examples 1 and 2 was coated uniformly on a glass plate so that the film thickness after drying became about 20 μm. Then, they were dried at 80° C. for 15 minutes, and the obtained polyurethane resin coating films were supplied to evaluation of pendulum hardness measurement 2.

[Measurement of Pencil Hardness]

In the laminated product of the glass plate and the polyurethane resin coating film obtained as mentioned above, pencil hardness of the resin coated film was measured according to the method of JIS K 5600-5-4.

[Pendulum Hardness]

In the laminated product of the glass plate and the polyurethane resin coating film obtained as mentioned above, pencil hardness of the resin coated film was measured by using a pendulum type hardness meter (pendulum hardness tester manufactured by BYK-Gardner GmbH) by measuring the amplitude attenuation time. The greater the amplitude attenuation time is, the greater the hardness is.

(Volatile Component Residual Ratio)

It was evaluated by measuring the weight of the polyurethane resin film at the time of preparation.

[Evaluation of Volatile Component Residual Ratio]

Each aqueous polyurethane resin dispersion of the above-mentioned Examples 1 to 6 and Comparative examples 1 to 4 was coated uniformly on a glass plate so that the film thickness after drying became about 20 μm. The weight of the coated aqueous polyurethane resin dispersion was measured. Then, they were dried at 80° C. for 30 minutes, and the weights of the obtained polyurethane resin films were measured. From the solid content concentration of the aqueous polyurethane resin dispersion, a volatile component residual amount in the coating film was calculated by using the following equation.

Calculation formula of the weight of volatile component:

(Volatile component weight)=(Weight of the film after drying)−(Weight of the coated aqueous polyurethane resin dispersion)×(Solid content concentration(%)/100)

Calculation formula of the residual ratio of volatile component:

(Volatile component residual ratio)=[(Weight of volatile component)/(Weight of the film after drying)]×100

(Swelling ratio)

Swelling ratio of the polyurethane resin film to water was evaluated by the following method.

[Preparation of Samples]

Each aqueous polyurethane resin dispersion of the above-mentioned Examples 1 to 6 and Comparative examples 1 to 3 was coated uniformly on a glass plate so that the film thickness after drying became about 60 μm. Then, they were allowed to stand at room temperature for 16 hours, dried at 60° C. for 1 hour, and then, at 120° C. for 2 hours. The film was peeled off from the glass, further dried at 120° C. for 2 hours, and supplied to evaluation.

[Evaluation of Swelling Ratio]

The weight of the sample was measured as mentioned above, and then, the sample was dipped in water for 3 hours. The weight after dipping was measured, and the swelling ratio was calculated from the following equation.

Swelling ratio[%]=[(Weight of the coating film after the swelling test)−(Weight of the coating film before the swelling test)]/(Weight of the coating film before the swelling test)×100

TABLE 1

| | Example 1 | Example 2 | Example 3 | Example 4 | Example 5 | Example 6 | Comparative example 1 | Comparative example 2 | Comparative example 3 | Comparative example 4 |
|---|---|---|---|---|---|---|---|---|---|---|
| UM90 (3/1) (parts by weight) | 41 | | | | | | 44 | | | |
| UC100 (parts by weight) | | 43 | 22 | 36 | 32 | 28 | | 46 | | |
| PTMG (parts by weight) | 5 | 5 | 22 | | | | | | 44 | 4 |
| UH100 (parts by weight) | | | | 10 | | | | | | 39 |
| UB100 (parts by weight) | | | | | 15 | | | | | |

TABLE 1-continued

|  | Example 1 | Example 2 | Example 3 | Example 4 | Example 5 | Example 6 | Comparative example 1 | Comparative example 2 | Comparative example 3 | Comparative example 4 |
|---|---|---|---|---|---|---|---|---|---|---|
| UH2032 (parts by weight) |  |  |  |  |  | 20 |  |  |  |  |
| Volatile component residual ratio (%) | 11 | 13 | 6 | 17 | 16 | 16 | 13 | 18 | 1 | 4 |
| Modulus of elasticity (MPa) | 1000 | 940 | 630 | 860 | 890 | 940 | 930 | 680 | 320 | 420 |
| Pencil hardness | B | B | 3B | 2B | 2B | B | 2B | 3B | <6B | <6B |
| Pendulum hardness 1 (s) | 303 | 285 | 288 | 277 | 272 | 282 | 266 | 267 | 196 | 267 |
| Pendulum hardness 2 (s) | 229 | 250 | 262 | 211 | 206 | 249 | 207 | 194 | — | — |
| Swelling ratio (%) | 1 | 1 | 1 | 2 | 2 | 2 | 1 | 2 | 1 | — |

Parts by weight in Table 1 represents parts by weight of the polyol when the whole solid components of the resin is made 100 parts by weight.

In Table 1, "pendulum hardness 1" is a pendulum hardness after drying at 80° C. for 30 minutes, and "pendulum hardness 2" is a pendulum hardness after drying at 80° C. for 15 minutes.

"<6B" in Table 1 means the pencil hardness is lower than 6B.

UTILIZABILITY IN INDUSTRY

The aqueous polyurethane resin dispersion of the present invention can be widely utilized as a paint or a coating agent alone or by formulating with other components.

The invention claimed is:

1. An aqueous polyurethane resin dispersion which comprises a polyurethane resin obtained by reacting (a) a polyol compound, (b) a polyisocyanate compound, (c) an acidic group-containing polyol compound, and (d) a chain-elongating agent being dispersed in an aqueous medium, wherein
  (a) the polyol compound contains at least (a1) a polycarbonate polyol having an alicyclic structure at the main chain and (a2) a polymer polyol having number average molecular weight of 500 to 5000 and having no alicyclic structure.

2. The aqueous polyurethane resin dispersion according to claim 1, wherein a number average molecular weight of (a1) the polycarbonate polyol having an alicyclic structure at the main chain is smaller than a number average molecular weight of (a2) the polymer polyol having no alicyclic structure.

3. The aqueous polyurethane resin dispersion according to claim 1, wherein (a2) the polymer polyol having a number average molecular weight of 500 to 5000 and having no alicyclic structure is a polyether polyol.

4. The aqueous polyurethane resin dispersion according to claim 1, wherein a weight ratio (a1/a2) of (a1) the polycarbonate polyol having an alicyclic structure at the main chain and (a2) the polymer polyol having number average molecular weight of 500 to 5000 and having no alicyclic structure in (a) the polyol compound is 99/1 to 25/75.

5. The aqueous polyurethane resin dispersion according to claim 1, wherein a ratio of an alicyclic structure of (a1) the polycarbonate polyol having an alicyclic structure at the main chain is 10 to 65% by weight.

6. The aqueous polyurethane resin dispersion according to claim 1, wherein (a) the polyol compound further contains (a3) a low-molecular weight polyol having a molecular weight of less than 500.

7. A paint composition containing the aqueous polyurethane resin dispersion according to claim 1.

8. A coating agent composition containing the aqueous polyurethane resin dispersion according to claim 1.

9. A process for preparing the aqueous polyurethane resin dispersion according to claim 1, which comprises the steps of:
  Step (α) of obtaining a prepolymer by reacting (a) a polyol compound which contains (a1) a polycarbonate polyol having an alicyclic structure at the main chain and (a2) a polymer polyol having a number average molecular weight of 500 to 5000 and having no alicyclic structure, (b) a polyisocyanate compound and (c) an acidic group-containing polyol,
  Step (β) of neutralizing the acidic group in the above-mentioned prepolymer,
  Step (γ) of dispersing the neutralized prepolymer in an aqueous medium, and
  Step (δ) of reacting the prepolymer dispersed in the aqueous medium and (d) a chain-elongating agent.

* * * * *